United States Patent
Sivaraman et al.

(10) Patent No.: US 9,990,211 B2
(45) Date of Patent: Jun. 5, 2018

(54) TRACKING WINDOW POSITION IN A VDI ENVIRONMENT

(71) Applicant: VMware, Inc., Palo Alto, CA (US)

(72) Inventors: Hari Sivaraman, Livermore, CA (US); Peter Farkas, Santa Cruz, CA (US)

(73) Assignee: VMware, Inc., Palo Alto, CA (US)

(*) Notice: Subject to any disclaimer, the term of this patent is extended or adjusted under 35 U.S.C. 154(b) by 37 days.

(21) Appl. No.: 15/183,203

(22) Filed: Jun. 15, 2016

(65) Prior Publication Data

US 2017/0364370 A1   Dec. 21, 2017

(51) Int. Cl.
G06K 9/00 (2006.01)
G06F 9/44 (2018.01)
G06T 7/00 (2017.01)
G06T 7/40 (2017.01)

(52) U.S. Cl.
CPC .......... *G06F 9/4445* (2013.01); *G06T 7/0044* (2013.01); *G06T 7/408* (2013.01); *G06T 2207/10024* (2013.01)

(58) Field of Classification Search
CPC ......... H04N 21/42204; H04N 21/4316; H04N 21/47; H04N 21/4334; G06F 3/0481
USPC ......... 382/107; 386/230, 239; 345/440, 590, 345/591
See application file for complete search history.

(56) References Cited

U.S. PATENT DOCUMENTS

| | | | | |
|---|---|---|---|---|
| 5,416,890 A | * | 5/1995 | Beretta | ............... G06F 3/04845 345/440 |
| 5,999,698 A | * | 12/1999 | Nakai | .................... G11B 19/02 348/E5.103 |
| 7,233,336 B2 | | 6/2007 | Mondal | |
| 2004/0255276 A1 | | 12/2004 | Rovang | |
| 2007/0022144 A1 | | 1/2007 | Chen | |
| 2007/0127893 A1 | * | 6/2007 | Ando | ............... G11B 20/00086 386/239 |
| 2009/0037774 A1 | | 2/2009 | Rideout et al. | |
| 2010/0007788 A1 | | 1/2010 | Lee et al. | |
| 2010/0161711 A1 | | 6/2010 | Makhija et al. | |
| 2010/0290667 A1 | | 11/2010 | Lienhart et al. | |
| 2011/0249572 A1 | | 10/2011 | Singhal et al. | |
| 2012/0084774 A1 | | 4/2012 | Post et al. | |

OTHER PUBLICATIONS

U.S. Office Action dated Jun. 17, 2014 for U.S. Appl. No. 13/432,331; 20 pages.
U.S. Notice of Allowance dated Aug. 1, 2014 for U.S. Appl. No. 13/432,331; 11 pages.

* cited by examiner

*Primary Examiner* — Charlotte M Baker
(74) *Attorney, Agent, or Firm* — Patterson & Sheridan, LLP (57) ABSTRACT

A method includes displaying a bitmap of unique groups of colored tiles on the display screen and reading a color value of a first pixel in a first tile in the bitmap. Color values of tiles within the first tile's group are determined. The position of the first pixel within the first tile is determined. The position of the first tile's group within the bitmap and the position of the first tile within the bitmap are also determined. The position of the first pixel in the bitmap and the position of the bitmap on the display screen are calculated. A performance metric is calculated based at least in part on the position of the bitmap on the display screen.

20 Claims, 10 Drawing Sheets

TRACKING WINDOW POSITION IN A VDI ENVIRONMENT

BACKGROUND

In virtual desktop infrastructures (VDIs), virtual desktop operating systems and applications, hosted on virtual machines (VMs) running on centralized servers, are delivered as managed services to end users via a network. Such centralized and automated management of the virtualized operating system, applications, and user data provides increased control and cost savings.

In a VDI environment, a framework may be applied to measure system performance. One measurement of system performance is a user experience test. A user experience test measures the speed, smoothness (evenness), and responsiveness when a window is dragged across a screen on a remote desktop or when content is scrolled inside a window. The user experience test tracks the movement of a particular bitmap painted inside the window that is being dragged or scrolled. The bitmap is designed so that reading the color of a pixel and its neighbors uniquely identifies the location of that pixel inside the window or within the content being scrolled. Using that information, the position of the entire window or content can be computed.

This approach has several drawbacks. First, the bitmap that is used is often color rich, more so than most other content that is used by a typical user. Measuring window-drag performance using a color-rich bitmap may result in performance measures that differ significantly from what an ordinary user actually experiences.

Second, since the bitmap assigns a unique color value to each pixel, any change in the color value due to lossy compression might cause the pixel to be misidentified or not identified at all by the client VM. Identification errors make it difficult to reliably measure the position of the window.

Third, since the color changes from one pixel to the next in the bitmap, high frequency components may be introduced in the signal that could change the behavior of the compression algorithm. Therefore, the performance measurement technique could significantly impact the performance that is being measured.

SUMMARY

One embodiment provides a computer-implemented method of tracking the position of a window. The method includes displaying a bitmap on the display screen, wherein the bitmap comprises a plurality of unique groups of colored tiles, wherein each tile comprises one or more pixels and an associated color value, and wherein the unique groups are separated by a delimiter that also comprises an associated color value. The method includes reading a color value of a first pixel in the bitmap. If the color value of the first pixel matches a color value of a first tile within a group, the method includes determining the color values of each of the other tiles within the first tile's group. The method includes determining the position of the first pixel within the first tile. The method also includes identifying the position of the first tile's group within the bitmap based on the color values of the tiles within the first tile's group and identifying the position of the first tile within the bitmap using the position of the first tile within the first tile's group and the position of the first tile's group within the bitmap. The method further includes calculating the position of the first pixel in the bitmap based on the position of the first pixel within the first tile and the position of the first tile within the bitmap, and also includes calculating the position of the bitmap on the display screen based on the position of the first pixel in the bitmap. The method also includes calculating a performance metric based at least in part on the position of the bitmap on the display screen.

Further embodiments of the present invention include a non-transitory computer-readable storage medium storing instructions that when executed by a computer system cause the computer system to perform the method steps above, and a system comprising a processor and memory that includes a program executable to perform the method steps above.

DETAILED DESCRIPTION

This disclosure presents techniques for calculating the position of a window using a simplified bitmap. In one embodiment, a three-color bitmap is used. The bitmap is divided into tiles of M×N pixels. Each tile is a member of a group or segment of a few neighboring tiles. No two groups of tiles have an identical pattern of colored tiles. Thus, the pattern of the color values of the tiles within each group uniquely identifies each group. The position of each group within the bitmap is known when the bitmap is constructed. For each selected pixel, the technique finds the pixel's position within the tile, the position of the tile within the group, and the position of the group within the bitmap. From that information, the position of the window can be computed. Measurements of the position of the window at various times are used to determine the speed, smoothness, or responsiveness of the movement of the window when it is dragged across a screen on a remote desktop or when content is being scrolled inside a window.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
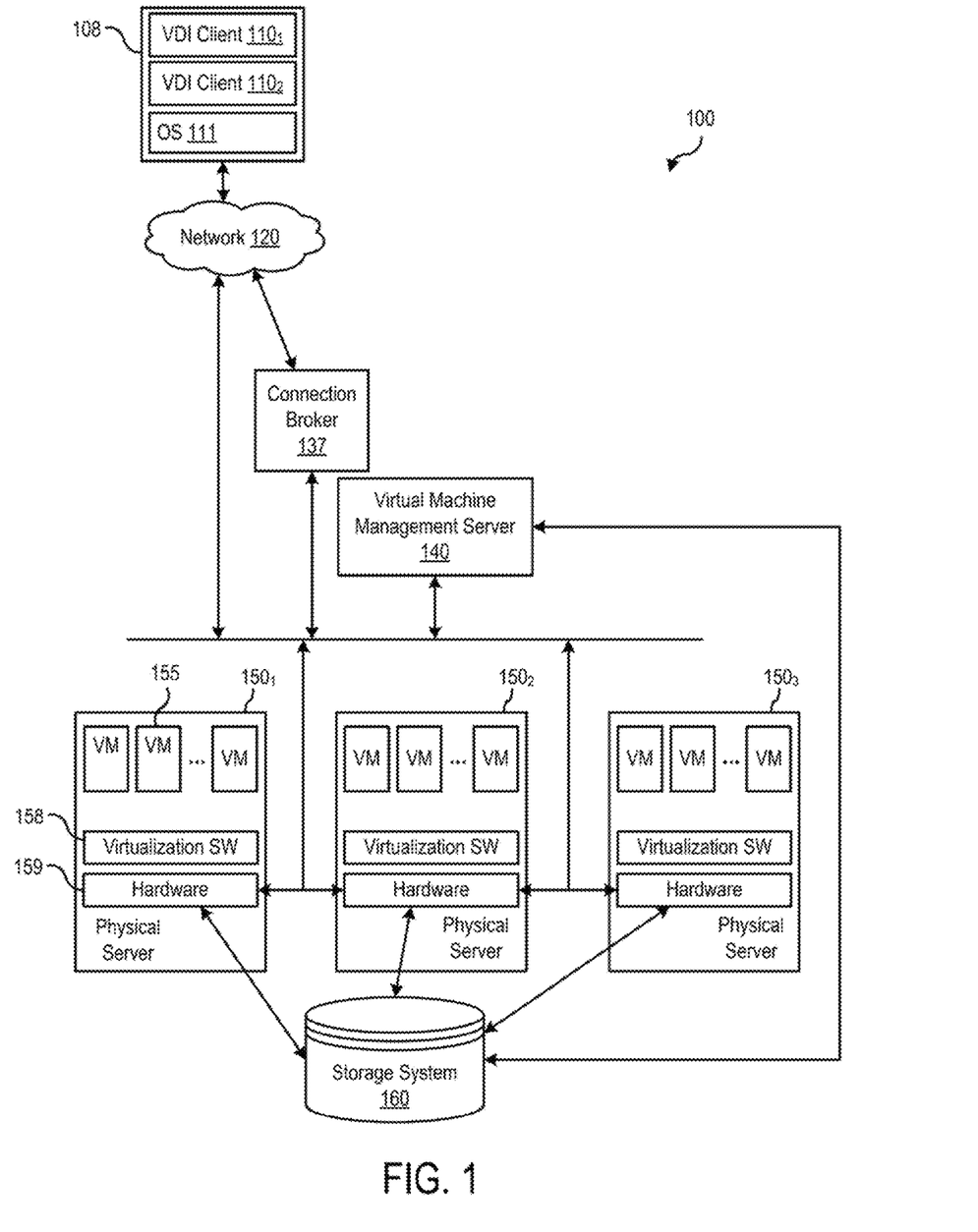
FIG. 1 illustrates components of a VDI system in which one or more embodiments of the present invention may be implemented.

FIG. 1 illustrates components of a VDI system 100 in which one or more embodiments of the present invention may be implemented. In VDI system 100, VDI client software programs (also referred to as "VDI clients" for short), e.g., VDI clients $110_{1-2}$, run on operating systems of local computing devices, e.g., client machine 108 on top of an operating system (OS) 111. Users can log into VDI clients 110 and access remote desktops or remote applications. Alternatively, VDI clients 110 may be standalone applications that can be installed on a computing device, such as a laptop, smartphone, or tablet computer. VDI clients 110 provide an interface for the users to access their desktops, which may be running in one of virtual machines 155 or blade server (not shown) in a data center that is remote from the user locations. With VDI clients, users can access desktops running in a remote data center through network 120, from any location, using a general purpose computer running a commodity operating system and a VDI client program.

VDI system 100 includes a connection broker 137 that manages connections between VDI clients and desktops running in virtual machines 155 or other platforms. Virtual machine management server 140 operates to configure and manage resources to create and deploy virtual machines. In the embodiments of the present invention illustrated herein, desktops are running in remote agents such as virtual machines (or virtual desktops) 155 which are instantiated on a plurality of physical computers 150, each of which includes virtualization software 158 and hardware 159 (CPU(s), memory, storage, etc.), is controlled by a virtual machine management server 140, and is coupled to a shared persistent storage system 160.

When a VDI client is accessing a remote desktop using a remote desktop protocol (e.g., RDP, PCoIP, VNC, etc.), the graphical user interface (GUI) of the desktop is generated on the server. The GUI image data is then encoded and transmitted over the network to the client device, where it is decoded and displayed to the user. For example, in one embodiment, the framebuffer pixel data on the server is encoded using a codec, such as H.264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device even though the desktop is actually executing remotely.

As previously mentioned, the network bandwidth and latency limitations in such an environment may present a number of challenges that may impact the end user experience because substantial amounts of image data need to be communicated from the virtual desktop to the client device very quickly. This is particularly significant in situations where the user is providing a lot of input that causes various portions of the GUI to be updated, such as rapidly moving windows, scrolling pages, and the like. If the client device is unable to update the interface presented to the user fast enough, (e.g., due to slow network connection), the user experience is significantly degraded. In many cases, it is desirable to quantifiably measure the end user experience and the system performance in VDI environments in order to gain a better understanding of the system resources that should be dedicated to enable smooth functioning operation.

In one embodiment, a framework is applied to characterize and measure system performance in a VDI environment. One component of the framework is a user-experience test that measures the speed, smoothness, or responsiveness when a window is dragged across the screen or content is scrolled inside the window. These tests provide an indication of how well a virtual machine is performing and/or how well the view software is performing. In one particular test, the movement of a bitmap inside the window that is being dragged or scrolled is tracked. The bitmap is designed so that reading the color (color is also referred to as "color value" herein) of a pixel and reading the colors of a certain number of neighboring pixels uniquely identifies the location of that pixel inside the window. Using that information, the position of the entire window can be computed. Embodiments described below use a simple three-color bitmap to uniquely identify the position of a window or content as it is dragged or scrolled across the screen of a remote desktop.

A remote desktop includes a number of observation points on the display. In the case when the movement of a window is studied, the observation points are selected such that at least one of them will fall within the window, no matter where the window is on the display. In the case of scrolling contents within a window, one observation point within the window will suffice. A software thread monitors what is being displayed at each of the observation points. The observation points are used to recognize a location in a window and the position of the window on the display. Measurements from the observation points are taken at specific moments to determine where the window is on the display. More specifically, the color value of the pixel at the observation points is determined at certain intervals. The bitmaps described herein allow the framework to easily calculate the position of the observation points in the window, and then calculate the position of the window on the display.

Figure 2:
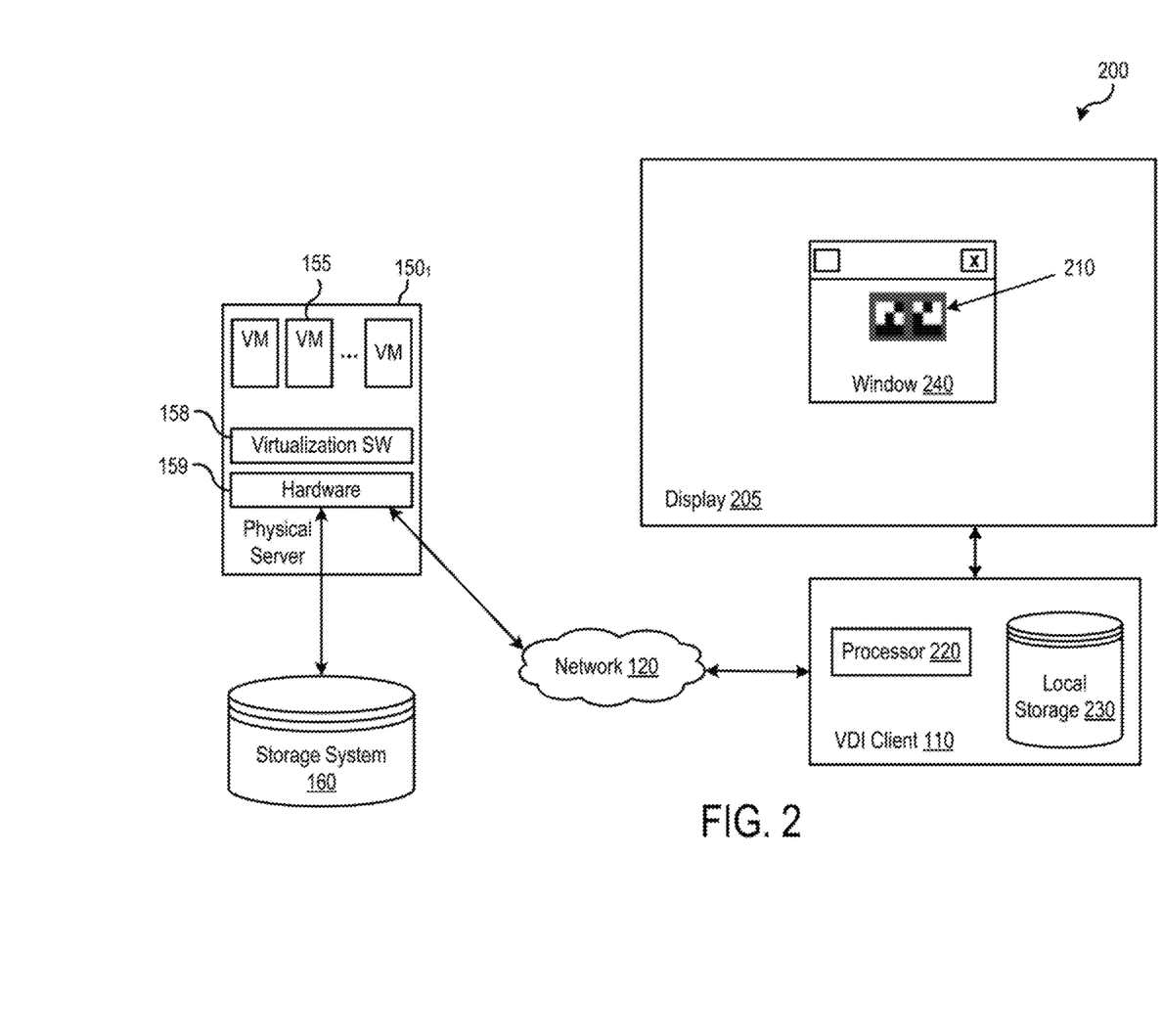
FIG. 2 illustrates an example portion of a system including a graphical user interface for a VDI client.

FIG. 2 illustrates an example portion of a system including a graphical user interface for a VDI client. VDI client 110 includes a processor 220 and local storage 230 in this example. As noted above, users can access virtual desktops 155 or remote applications from a browser on any device, such as a laptop, thin client device, desktop personal computer, tablet, or phone. VDI client 110 also comprises a display 205. Illustrated on display 205 is bitmap 210 within window 240. Only a portion of an example bitmap is illustrated as bitmap 210. The details and size of the bitmap can vary in different embodiments. As window 240 is moved across the display or content is scrolled in window 240, the location of bitmap 210 can be tracked according to the embodiments described herein.

FIG. 2 also illustrates desktops running in virtual machines 155 which are instantiated on a physical computer 150 that includes virtualization software 158 and hardware 159 (CPU(s), memory, storage, etc.), and is coupled to a shared persistent storage system 160 and network 120. VDI client 110 is coupled to physical computer 150 through network 120. For simplicity, other components illustrated in FIG. 1 are not shown in FIG. 2.

Figure 3:
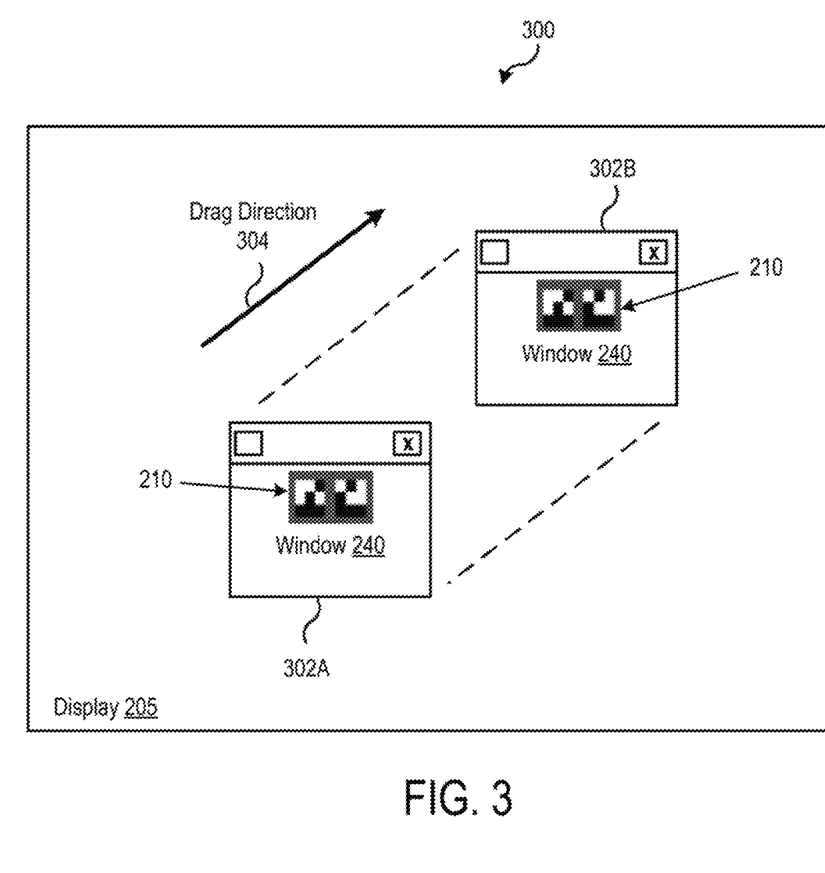
FIG. 3 illustrates an example of a window being dragged across a screen according to an embodiment.

FIG. 3 illustrates an example virtual desktop 300 and an operation comprising a window 240 being dragged across a screen. Display 205 displays a window 240 that is dragged across the display 205 in a drag direction 304. At a first moment in time, window 240 is at position 302A, and at a second moment in time window 240 is at position 302B. As window 240 is dragged across the display in direction 304, a software thread monitors a set of observation points on the display. As bitmap 210 crosses one or more observation points, the pixel colors of bitmap 210 at the observation points are detected and the location of bitmap 210 is determined according to embodiments described herein. Once the exact location of the bitmap 210 is determined for one or more points in time, performance metrics can be determined, such as latency, smoothness or evenness of the movement, etc.

Figure 4:
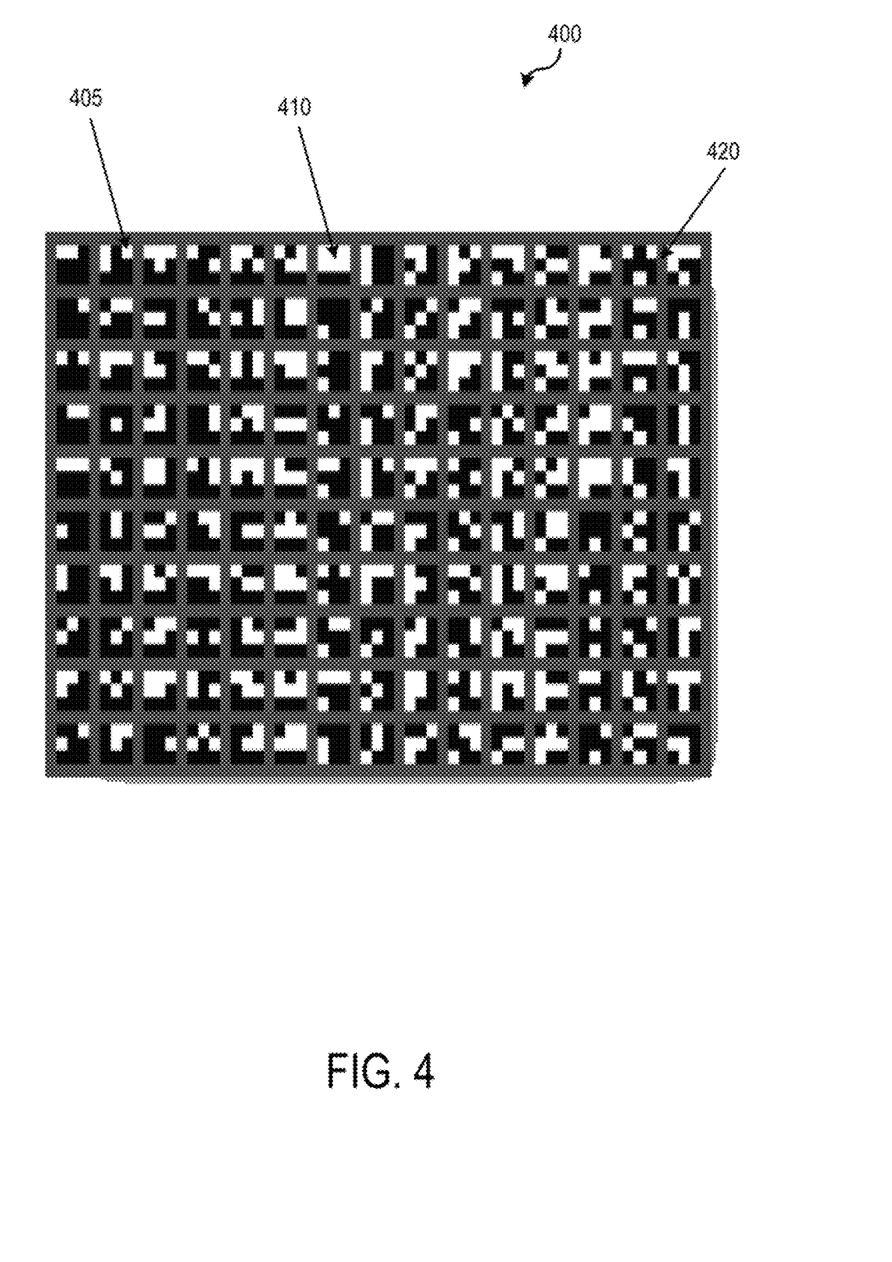
FIG. 4 illustrates an example bitmap according to one embodiment.

FIG. 4 illustrates an example bitmap 400 according to an embodiment. Bitmap 400 is comprised of black and white tiles 405 arranged in unique groups 410 of 3×3 tiles 405. In this bitmap 400, each tile 405 is 8×8 pixels. The tiles can be other sizes in other embodiments. The tiles 405 are colored black, white, or red. Note that the red tiles may appear gray or grayscale in certain representations of the attached figures that are not in color. The black and white tiles are arranged in groups 410 of 3×3 tiles. No two of these groups 410 are identical. The red tiles are used as delimiters 420. The delimiters 420 separate the groups 410 from one another. Both horizontal and vertical delimiters 420 are used in bitmap 400.

Bitmap 400 includes 15 columns and 10 rows of groups 410. Therefore 150 unique groups 410 of black and white tiles 405 are illustrated in FIG. 4. Because each group 410 is composed of 9 tiles 405, and each tile 405 can be either black or white, there are $2^9$, or 512, possible unique groups 410. In other embodiments, the groups 410 can be different sizes, such as 4×4 tiles.

As described in further detail below, when bitmap 400 is over an observation point on the display, the color value of a first pixel at the observation point is read, along with the color value of pixels in neighboring tiles 405, to determine which tile 405 the first pixel belongs to. If the first pixel is red, the pixel is on a delimiter 420. If the pixel is on a delimiter 420, "move" eight pixels "up," or "down," or "left," or "right," or in a combination of two of these directions until a black or white pixel is found. The algorithm then continues from the black or white pixel, remembering this displacement" or "offset" for the final computation of the position of the window.

If the first pixel is black or white, the pixel is in a tile 405 that belongs to a group 410 composed of 3×3 tiles 405. The colors of the neighboring tiles 405 are read in all four directions from the first pixel (up, down, left, and right). These colors identify the position of the tile 405 within the group of 3×3 tiles (i.e., is the tile in the center, top right, bottom left, etc. of the group 410 of 3×3 tiles). When the position of the tile 405 within the group 410 is determined, movements are performed in the appropriate directions to determine where in the group 410 the first pixel is in. The group 410 is determined by reading the color of each of the 9 tiles within the group 410. Because each group 410 is unique, the color pattern of the 9 tiles uniquely identifies the group 410. Next, the position of the group 410 within the larger bitmap 400 is determined. The positions of each of the groups 410 in the bitmap 400 are known when the bitmap is constructed. Therefore, the position of the group 410 can be looked up in an index that tracks those positions. The position of the group 410 in the bitmap 400, the position of the tile 405 in the group 410, and the position of the first pixel in the tile 405 are used to calculate the position of the first pixel in the bitmap 400. Using the known position of the first pixel in the bitmap 400, the position of the bitmap 400 on the screen can be calculated.

Figure 5:
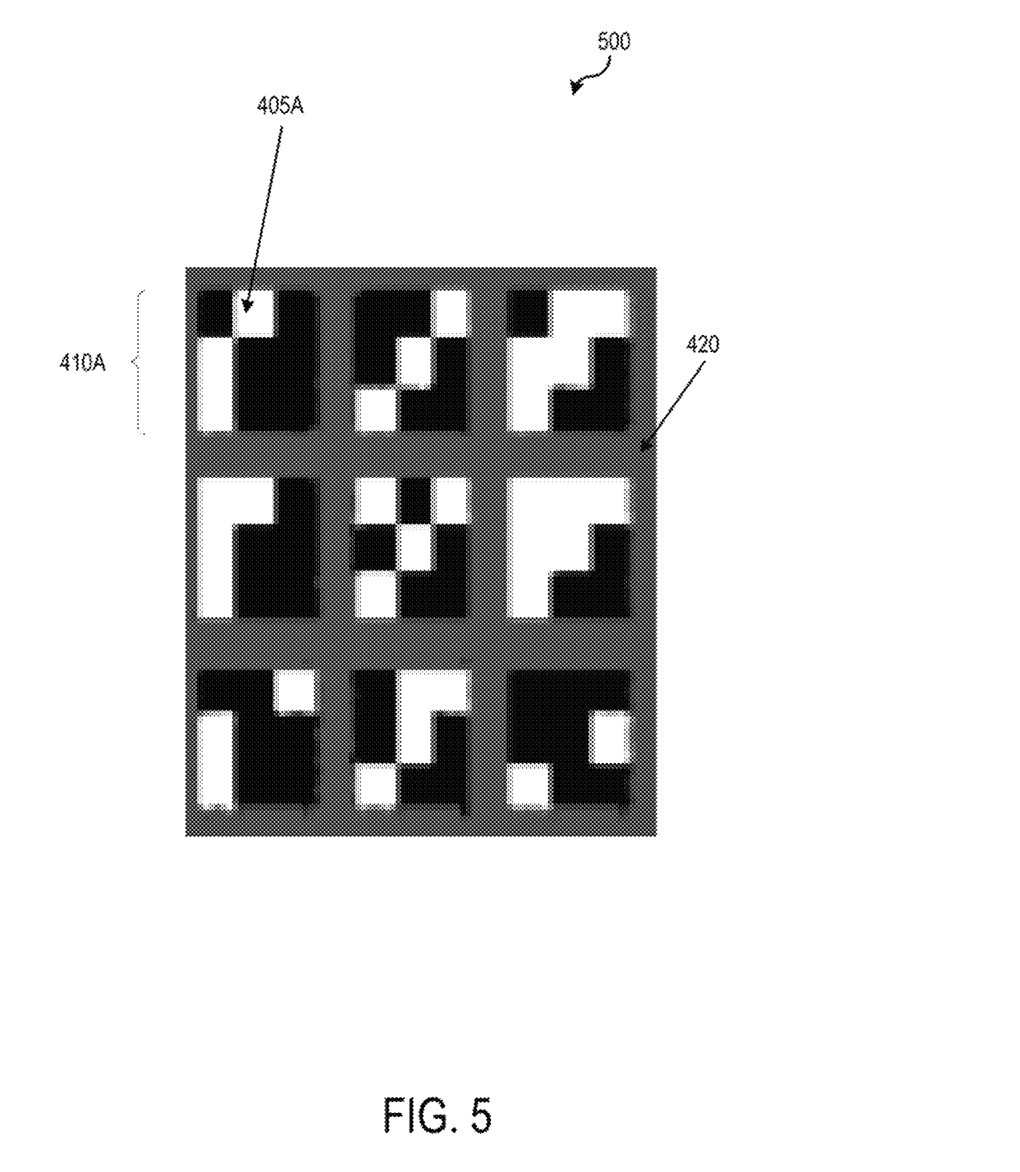
FIG. 5 illustrates a portion of the example bitmap illustrated in FIG. 4.

FIG. 5 illustrates a portion 500 of the example bitmap 400 illustrated in FIG. 4. The portion 500 illustrated here comprises nine groups 410 of tiles 405. As an example, the top left group of nine tiles is labeled 410A and is used to demonstrate one example embodiment. Each tile (red, white, or black) is comprised of 8×8 pixels.

In this example, an observation point observes a pixel that belongs to tile 405A. This pixel is referred to as the "first pixel" for clarity in this example. The first pixel is white, as tile 405A is white. Therefore, because the first pixel was either black or white, the first pixel is located in a group of 3×3 tiles and is not located on the delimiters, which are red. The next step in the method is to read the colors of neighboring tiles in four directions to determine the position of the tile containing the first pixel within the group 410A. To read the colors, the neighboring pixels that are eight pixels away from the first pixel can be read. Because each tile 405 is 8×8 pixels in size in this example, moving eight pixels in each direction will land on a pixel in a different tile. Here, moving eight pixels up will result in a red pixel. Moving eight pixels right results in a black pixel. Moving eight pixels down results in a black pixel. Finally, moving eight pixels left results in a black pixel. Therefore, it is determined that tile 405A is the top center tile of its group 410A. Only the top center tile has a red tile above it and either black or white tiles on the other three sides.

The next step is to read the color of a suitable number of pixels in a suitable direction to establish the position of the first pixel within the tile. In other words, determine the location of the first pixel within the 8×8 array of pixels that comprises the tile 405A. The individual pixels are not illustrated in FIG. 5. However, this step is performed by reading the color of a suitable number of pixels in a suitable direction or directions to establish the position of the first pixel within the tile 405A. The pixel location data is saved for determining the location of the bitmap, to pixel accuracy, in a subsequent step.

As an example, if the pixel directly above the first pixel were red, then it is determined that the first pixel is in the top row of the 8×8 pixels of tile 405A. If the pixel above the first pixel is white but the second pixel above the first pixel is red, then the first pixel is in the second row of the 8×8 pixels of tile 405A. Similar pixel colors are read in as many directions as needed to determine the location of the first pixel within the tile 405A.

The next step is to read the colors of the nine tiles within the group 410A. This step is also performed by moving a set number of pixels in one or two movements and reading the color of the subsequent pixel. For example, moving eight pixels down from the first pixel resulted in a black pixel. Therefore, the center tile in group 410A is black. Moving down another eight pixels will locate a pixel in the bottom center tile of the group. This tile is also black. Suitable movements and color determinations are performed until the color of all nine tiles in group 410A are known.

When the colors of the tiles in group 410A are known, group 410A is uniquely identified. The next step is to identify the position of the group in bitmap 400. The positions of the groups 410 are stored when bitmap 400 is generated. Therefore a simple lookup can be performed to determine the position of group 410A within the bitmap. In this example, looking back at FIG. 4, group 410A is located in the second row and eighth column of bitmap 400. Certain embodiments could assign a unique identifier to each group (such as a 9-bit integer) and lookup the location of the group with that identifier.

The next step is to identify the position of the tile 405A in the bitmap 400. The position of the tile in the group is known. In this example, tile 405A is the top center tile in group 410A. Also, the position of group 410A in the bitmap 400 is known. Therefore, the position of tile 405A within bitmap 400 is easily determined. Next, using the position of the first pixel in tile 405A (which was determined in a previous step), the position of the first pixel in the bitmap 400 is determined. Additionally, now that the position of the first pixel within the bitmap 400 is known, the position of the bitmap 400 on the screen can be calculated, since the first pixel is one of the observation points, and the position of the observation points on the screen is known.

These type of pixels observation and calculations can be performed rapidly and periodically, for example every few milliseconds. The position of the bitmap 400 can be recorded and saved at each moment in time. Then, that data is used to calculate frames per second, or how smoothly or evenly an image is moving. For example, the variance of position over multiple samples in time can illustrate how smoothly or how evenly an image is moving on the screen. If a sample is taken every millisecond, and the bitmap 400 moves a first distance X during each of a first two milliseconds, but then moves a second distance 0.5X during a third millisecond, the movement is not even or smooth through time. Other metrics may be determined as well, and these metrics can be used to modify and improve the user experience.

In this example embodiment, an adjustment is needed if the first pixel is a red pixel. The red pixels are located on the delimiters between the groups of tiles. If the first pixel is a red pixel, a movement of eight pixels is made in one of the four possible directions to a black or white pixel. If the red pixel is on a corner where the delimiters meet, two movements may need to be performed to land on a black or white pixel. For example, moving eight pixels in each of the four possible directions may all result in landing on a red pixel again. Therefore, a second movement of eight pixels that is perpendicular to the first movement is performed until a black or white pixel is located.

Once a black or white pixel is located, the algorithm as described above is used to determine the location of the bitmap. However, the offset from the black or white pixel to the original red pixel should be saved and used. This offset must be accounted for when the position of the pixel in the bitmap is determined according to the method above. Otherwise, the calculated position of the bitmap would be off by a small number of pixels.

Figure 6:
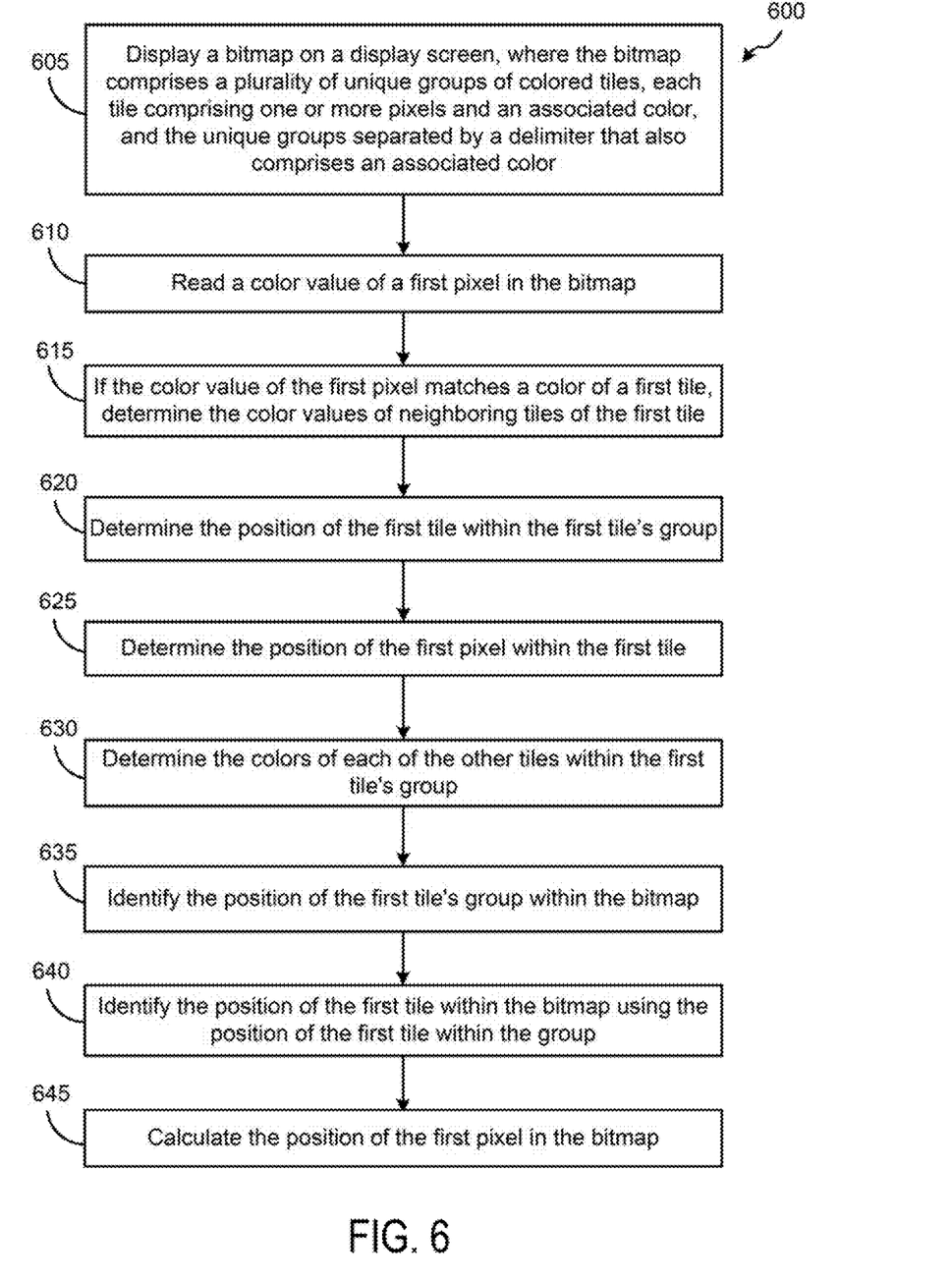
FIG. 6 is a flowchart illustrating a method for determining a position of a bitmap on a screen.

FIG. 6 is a flow diagram that illustrates a method 600 of determining the position of a window in a virtual computing environment. Although the method steps are described in conjunction with the systems of FIGS. 1-5, persons skilled in the art will understand that any system configured to perform the method steps falls within the scope of the present invention. In various embodiments, the hardware and/or software elements described above in FIGS. 1-5 can be configured to perform the method steps of FIG. 6. For example, processor 220 of VDI client 110 can perform the method steps.

The method begins at step 605, where a client displays a bitmap on a display screen, where the bitmap comprises a plurality of unique groups of colored tiles, wherein each tile comprises one or more pixels and an associated color, and wherein the unique groups are separated by a delimiter that also comprises an associated color. In one example embodiment described herein, the unique groups are comprised of nine tiles that are either black or white arranged in a 3×3 grid. The color associated with the delimiter is red. Other embodiments may use any other suitable colors or any suitable group size.

The method proceeds to step 610, where the processor reads a color value of a first pixel in the bitmap. In one example, a number of observation points are dispersed on a display screen. These observation points read the color value of pixels located at the observation points at various moments in time. The color value readings are then used to determine the location of a bitmap on the display screen at various points in time.

The method proceeds to step 615, where, if the color value of the first pixel matches a color of a first tile, the processor determines the color values of neighboring tiles of the first tile. In one example embodiment described herein, the tiles in the group are either black or white. If the color value of the first pixel is black or white, the first pixel is located within a tile (referred to as the first tile). If the color value of the first pixel is the color associated with the delimiter (red in this example), one or more movements in a specific direction can be performed to locate a second pixel (offset from the first pixel) that is within a black or white tile. At that point, the algorithm can proceed as described below, with the offset tracked for use in future location calculations. If the color value is any color other than black, white, or red, then the pixel is not located within the bitmap and another observation point should be queried to locate a pixel within the bitmap.

To determine the color values of neighboring tiles of the first tile in step 615, pixels that are a predetermined number of pixels away from the first pixel are queried to determine their color values. These pixel colors provide the color of neighboring tiles. For example, if each tile is 8×8 pixels, a movement of eight pixels in each of the four directions (up, down, left, right) will land on a pixel in a neighboring tile. The processor reads the color values in those four directions and identifies the colors of those four neighboring tiles.

The method proceeds to step 620, where the processor determines the position of the first tile within the first tile's group. The position is determined from the colors of the neighboring tiles. Delimiter tiles are red in one example, while tiles within the group are either black or white. As described above, the location(s) of one or more neighboring red tiles specifies the position within the group of the first tile. If there are no neighboring red tiles, then the first tile is in the center of the group of 3×3 tiles. If other group sizes are used (such as 4×4), colors from more than four neighboring tiles might need to be used to determine position within the group, but the process is similar to the process described here.

The method proceeds to step 625, where the processor determines the position of the first pixel within the first tile. This step is performed by reading the color of a suitable number of pixels in a suitable direction or directions to establish the position of the first pixel within the first tile, as described in further detail above. The position information of the first pixel within the first tile is saved for use in a subsequent step.

The method proceeds to step 630, where the processor determines the colors of each of the other tiles within the first tile's group. The process for determining these colors is similar to the process described above for determining the colors of neighboring tiles. Movements of a specific number of pixels are made in one or more directions and then color values of the destination pixels are read. These color values indicate the color of the tiles within the group. Step 630 is concluded when the color of each tile within the group has been determined.

The method proceeds to step 635, where the processor identifies the position of the first tile's group within the entire bitmap. The positions of the groups in the bitmap are known when the bitmap is created. Therefore, this position does not have to be calculated but instead can be looked up in an index or directory that identifies the location of each unique group within the bitmap.

The method proceeds to step 640, where the processor identifies the position of the first tile within the bitmap using the position of the first tile within the group. The position of the first tile within the group was determined at step 620, and the position of the group within the bitmap was determined in step 635. Therefore, a simple translation can be performed to identify the position of the first tile within the bitmap.

The method proceeds to step 645, where the processor calculates the position of the first pixel in the bitmap. The position of the first tile within the bitmap was determined in step 640. Additionally, the position of the first pixel within the first tile was determined in step 625. Another simple translation can be performed to identify the position of the pixel in the bitmap. Once the position of the pixel in the bitmap is known, the position of the bitmap on the display screen can be determined. This is possible because the pixel is located at a known observation point on the display screen. If the position of a moving bitmap is determined at multiple points in time, various performance metrics can be calculated based on the movement. For example, the speed or smoothness of a moving window can be measured.

Figure 7:
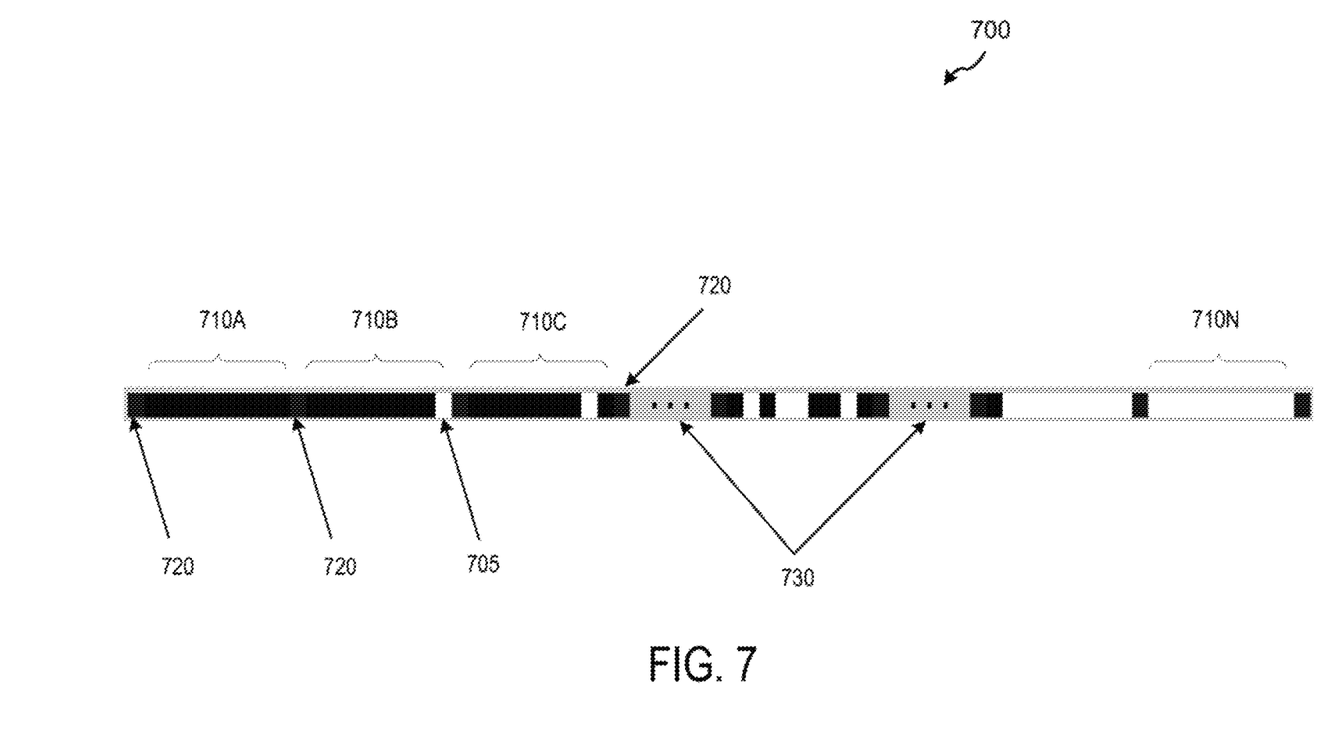
FIG. 7 illustrates an example array of tiles used to construct a bitmap according to another embodiment.

FIG. 7 illustrates an example array 700 of tiles 705 used to construct a bitmap according to another embodiment. In this embodiment, tiles 705 are of size 8×8 pixels. Each tile 705 is either black, white, or red. The red tiles are used as delimiters 720 between "segments" 710 that consist of nine tiles, arranged in a row that is nine tiles wide and one tile high (9×1). The segments 710 consist of nine black or white tiles arranged in various combinations. In this example, the array 700 comprises every possible segment 710 of nine black and white tiles. There are $2^9$ (512) possible segments. The segments are each separated by a red tile, and the array begins and ends with a red tile. As seen in FIG. 7, the first segment 710A is comprised of nine black tiles. The second segment 710B is comprised of eight black tiles followed by a white tile. The third segment 710C is comprised of seven black tiles, a white tile, and then a black tile. The grey ellipses 730 denote a sequence of segments that are not shown for simplicity. Finally, the array ends with a segment 710N comprised of nine white tiles.

This example array 700 is of size 512×9+513=5121 tiles long. Rectangular bitmaps are formed by simply "wrapping" the array to form the rows of the bitmap. Bitmaps can be formed of size X by Y tiles, where X*Y does not exceed 5121. Each horizontal row of the bitmap will be different. Once the bitmap is formed, a process similar to the processes described above with respect to FIGS. 4-6 is performed to determine the position of a window on a display screen.

Figure 8:
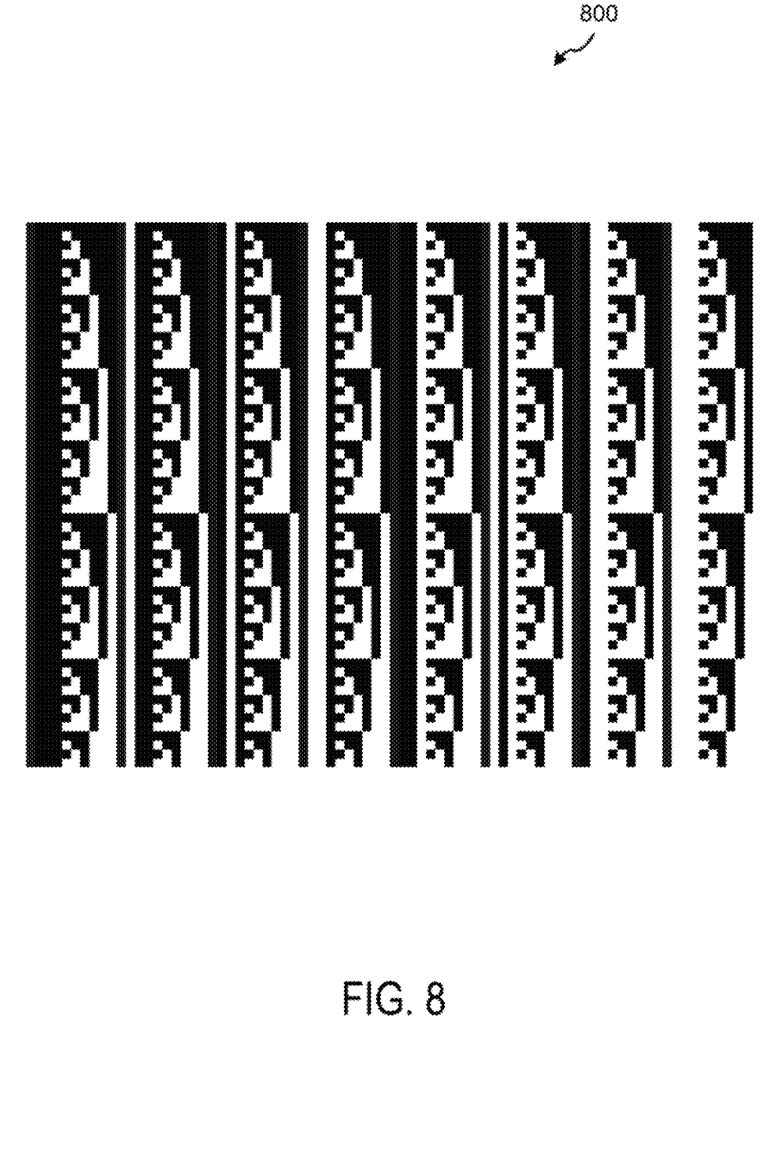
FIG. 8 illustrates an example bitmap constructed from the array of FIG. 7.

FIG. 8 illustrates an example bitmap 800 of size 640×480 pixels, created by wrapping array 700. The top row of bitmap 800 comprises the first 640 pixels of array 700. Because the tiles 705 are each 8×8 pixels, each row of bitmap 800 comprises 80 tiles (640/8). Eighty tiles constitute eight full segments (8×9, or 72 tiles) plus eight delimiters. Therefore, the red delimiters 720 line up vertically in this example. Also, the whole array does not need to be used to form the bitmap 800; only as many segments 710 as necessary are used to create a bitmap of the desired size.

Figure 9:
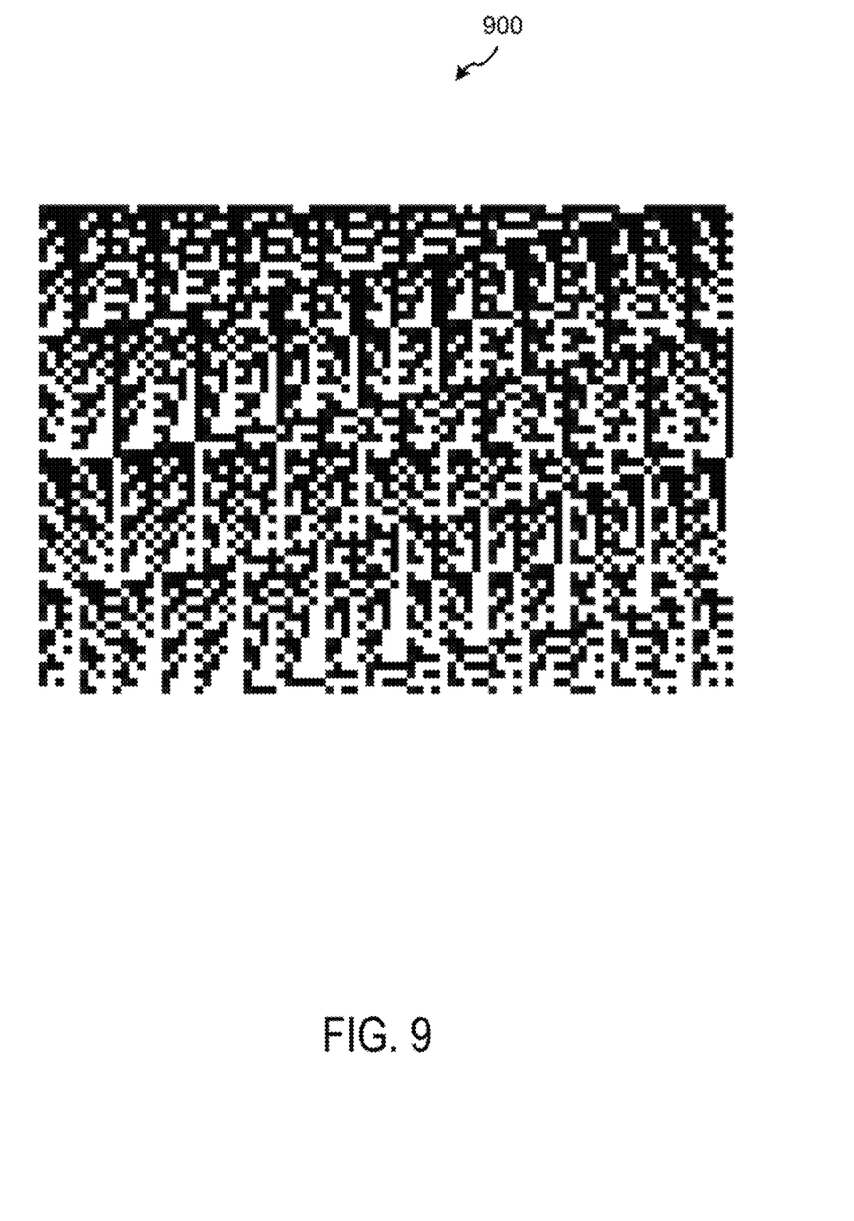
FIG. 9 illustrates another example bitmap constructed from the array of FIG. 7.

FIG. 9 illustrates another example bitmap 900 of size 680×480 pixels, created by wrapping array 700. In bitmap 900, the line breaks do not occur on the segment edges as they did in FIG. 8. Therefore, the red delimiters do not line up like they did in FIG. 8.

In an example embodiment utilizing one of the bitmaps illustrated in FIG. 8 or 9, an observation point observes a pixel that belongs to a tile. This pixel is referred to as the "first pixel" for clarity in this example. If the first pixel is black or white, the first pixel is located within a segment. If the first pixel is red, the first pixel is located on a delimiter. A similar process with respect to FIGS. 4-6 can be used if the first pixel is located on a delimiter. That is, a movement of eight pixels to the left or right can be performed to locate a pixel in an adjacent black or white tile. If the edge of the bitmap is reached, the movement can wrap to the previous or next row, whichever is needed, to find the adjacent tile. In the example bitmaps illustrated with respect to FIGS. 7-9, no two red tiles are next to one another. Therefore, a movement of eight pixels left or right will always land on a black or white tile (as long as the landing pixel is within the bitmap). Also, movements only need to be performed left and right, not up and down, to determine the colors of tiles within the segment, because the segments are arranged in a linear pattern of 9×1 tiles.

If the first pixel corresponding to the observation point is a black or white pixel, or after a movement to the left or right has been performed to move off of a red tile, the tile is known to be a part of a segment. The next step is to determine the color values of each of the other tiles within the first tile's group or segment. Because the segments are linear, the method can move left or right eight pixels at a time, recording the color of each pixel it lands on. These movements can be performed in both directions until a red delimiter tile is reached in both directions. Once a red delimiter tile is reached in both directions, each tile in the segment has been read to determine its color and the pattern of black and white tiles within the segment has been determined.

As an example, the first pixel could be located in the leftmost tile of a segment comprised of nine black tiles. A movement of eight pixels to the left will land on the red delimiter tile. Therefore, the algorithm that performs the operations determines that the first pixel is in the leftmost tile of its segment. The method then proceeds to move eight pixels to the right, determine a color value, again move eight pixels to the right, determine another color value, etc., until all nine tiles in the segment have been traversed and the color of each tile has been determined. In this example, all nine tiles in the segment are black.

The next step is to determine the position of the first pixel within the first tile. Movements can be performed pixel by pixel, to the left and right and up and down, to determine the location of the first pixel within the first tile.

The next step is to identify the position of the first tile's segment within the bitmap. The positions of the segments in the bitmap are known when the bitmap is created. Therefore, this position does not have to be calculated but instead can be looked up in an index or directory that identifies the location of each unique segment within the bitmap.

Once the position of the segment within the bitmap is identified, the position of the first tile within the bitmap is determined using the position of the first tile within the first tile's segment. Finally, the position of the first pixel in the bitmap is calculated based on the position of the first pixel within the first tile.

Figure 10:
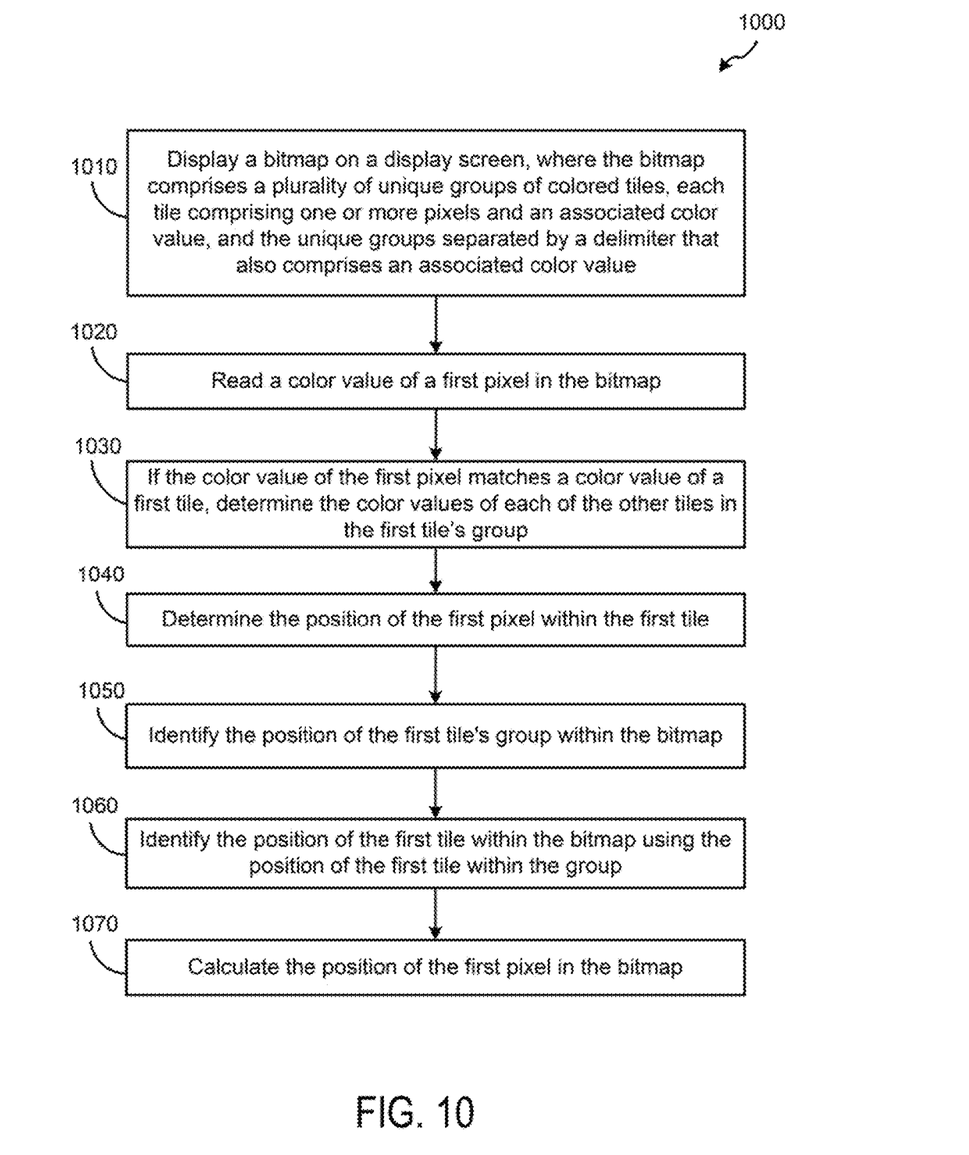
FIG. 10 is a flowchart illustrating another method for determining a position of a bitmap on a screen.

FIG. 10 is a flow diagram that illustrates a method 1000 of determining the position of a window in a virtual computing environment. Although the method steps are described in conjunction with the systems of FIGS. 1-3 and 7-9, persons skilled in the art will understand that any system configured to perform the method steps falls within the scope of the present invention. In various embodiments, the hardware and/or software elements described above in FIGS. 1-3 and 7-9 can be configured to perform the method steps of FIG. 10. For example, processor 220 of VDI client 110 can perform the method steps.

The method begins at step 1010, where a client displays a bitmap on a display screen, where the bitmap comprises a plurality of unique groups of colored tiles, wherein each tile comprises one or more pixels and an associated color value, and wherein the unique groups are separated by a delimiter that also comprises an associated color value. In one example embodiment described herein, the unique groups are comprised of nine tiles that are either black or white and are arranged in a 9×1 segment or group. The color value associated with the delimiter is red. Other embodiments may use any other suitable color values or any suitable group size.

The method proceeds to step 1020, where the processor reads a color value of a first pixel in the bitmap. In one example, a number of observation points are dispersed on a display screen. These observation points read the color value of pixels located at the observation points at various moments in time. The color value readings are then used to determine the location of a bitmap on the display screen at various points in time.

The method proceeds to step 1030, where, if the color value of the first pixel matches a color value of a first tile, the processor determines the color values of each of the other tiles within the first tile's group. In one example embodiment described herein, the tiles in the group are either black or white. If the color value of the first pixel is black or white, the first pixel is located within a tile (referred to as the first tile). If the color value of the first pixel is the color associated with the delimiter (red in this example), one or more movements in a specific direction can be performed to locate a second pixel (offset from the first pixel) that is within a black or white tile. At that point, the algorithm can proceed as described below, with the offset tracked for use in future location calculations. If the color value is any color other than black, white, or red, then the pixel is not located within the bitmap and another observation point should be queried to locate a pixel within the bitmap.

To determine the color values of each of the other tiles within the first tile's group in step 1030, pixels that are a predetermined number of pixels away from the first pixel are queried to determine their color values. As explained above, because the segments are linear, the method can move left or right eight pixels at a time, recording the color value of each pixel it lands on. These movements can be performed in both directions until a red delimiter tile is reached in both directions. Once a red delimiter tile is reached in both directions, each tile in the group has been read to determine its color value and the pattern of black and white tiles within the group has been determined. Also, because the color values of each of the tiles in the group are now known, the position of the first tile within the group is also known.

The method proceeds to step 1040, where the processor determines the position of the first pixel within the first tile. This step is performed by reading the color values of a suitable number of pixels in a suitable direction or directions to establish the position of the first pixel within the first tile, as described in further detail above. The position information of the first pixel within the first tile is saved for use in a subsequent step.

The method proceeds to step 1050, where the processor identifies the position of the first tile's group within the entire bitmap based on the color values of the tiles within the first tile's group. The positions of the groups in the bitmap are known when the bitmap is created. Therefore, this position does not have to be calculated but instead can be looked up in an index or directory that identifies the location of each unique group within the bitmap.

The method proceeds to step 1060, where the processor identifies the position of the first tile within the bitmap using the position of the first tile within the first tile's group and the position of the first tile's group within the bitmap. The position of the first tile within the group was determined at step 1030, and the position of the group within the bitmap was determined in step 1050. Therefore, a simple translation can be performed to identify the position of the first tile within the bitmap.

The method proceeds to step 1070, where the processor calculates the position of the first pixel in the bitmap. The position of the first tile within the bitmap was determined in step 1050. Additionally, the position of the first pixel within the first tile was determined in step 1040. Another simple translation can be performed to identify the position of the pixel in the bitmap. Once the position of the pixel in the bitmap is known, the position of the bitmap on the display screen can be determined. If the position of a moving bitmap is determined at multiple points in time, various performance metrics can be calculated based on the movement. For example, the speed or smoothness of a moving window can be measured.

In other embodiments, the tiles can be sizes other than 8×8 pixels. Also, more than three colors can be used in other embodiments. In addition, groups or segments do not need to have nine tiles, but can use any suitable number of tiles. Larger bitmaps for use on larger display screens may require more than three colors or larger groups of tiles. Also, tiles do not necessarily need to be square or linear.

Advantageously, techniques disclosed herein permit measurement of system performance in a virtual computing environment. Simple bitmaps are used to uniquely identify the position of a window or content as it is dragged or scrolled across the screen of a remote desktop. The bitmaps described herein do not require each pixel of the bitmap to have a unique color.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Many variations, modifications, additions, and improvements are possible. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for tracking a window on a display screen, comprising:

displaying a bitmap on the display screen, wherein the bitmap comprises a plurality of unique groups of colored tiles, wherein each tile comprises one or more pixels and an associated color value, and wherein the unique groups are separated by a delimiter that also comprises an associated color value;

reading a color value of a first pixel in the bitmap;

if the color value of the first pixel matches a color value of a first tile within a group, determining the color values of each of the other tiles within the first tile's group;

determining the position of the first pixel within the first tile;

identifying the position of the first tile's group within the bitmap based on the color values of the tiles within the first tile's group;

identifying the position of the first tile within the bitmap using the position of the first tile within the first tile's group and the position of the first tile's group within the bitmap;

calculating the position of the first pixel in the bitmap based on the position of the first pixel within the first tile and the position of the first tile within the bitmap;

calculating the position of the bitmap on the display screen based on the position of the first pixel in the bitmap; and calculating a performance metric used to quantify and improve user experience, including at least one of latency, smoothness, or evenness of a movement, the performance metric being calculated based at least in part on the position of the bitmap on the display screen.

2. The method of claim 1, further comprising:

if the color value of the first pixel matches the color value of the delimiter, performing one or more pixel movements across the bitmap by reading the color value of a pixel at a distance of a pre-determined number of pixels until a second pixel is located in a second tile of a different color value;

determining the color values of each of the other tiles within the second tile's group;

determining the position of the second pixel within the second tile;

identifying the position of the second tile's group within the bitmap based on the color values of the tiles within the second tile's group;

identifying the position of the second tile within the bitmap using the position of the second tile within the second tile's group and the position of the second tile's group within the bitmap;

calculating the position of the second pixel in the bitmap based on the position of the second pixel within the second tile and the position of the second tile within the bitmap; and calculating the position of the first pixel in the bitmap based on the position of the second pixel in the bitmap.

3. The method of claim 1, wherein determining the color values of each of the other tiles within the first tile's group comprises:

reading color values of pixels a predetermined number of pixels away from the first tile in one or more directions in the bitmap.

4. The method of claim 3, wherein determining the color values of each of the other tiles within the first tile's group further determines the position of the first tile within the first tile's group.

5. The method of claim 1, wherein the bitmap comprises three color values.

6. The method of claim 1, wherein the performance metric comprises the evenness of movement of the bitmap on the display screen.

7. The method of claim 1, wherein reading a color value of a first pixel in the bitmap comprises reading a color value at a predetermined observation point on the display screen.

8. A non-transitory computer-readable storage medium containing a program which, when executed by one or more processors, performs operations for tracking a window on a display screen, the operations comprising:

displaying a bitmap on the display screen, wherein the bitmap comprises a plurality of unique groups of colored tiles, wherein each tile comprises one or more pixels and an associated color value, and wherein the unique groups are separated by a delimiter that also comprises an associated color value;

reading a color value of a first pixel in the bitmap;

if the color value of the first pixel matches a color value of a first tile within a group, determining the color values of each of the other tiles within the first tile's group;

determining the position of the first pixel within the first tile;

identifying the position of the first tile's group within the bitmap based on the color value of the tiles within the first tile's group;

identifying the position of the first tile within the bitmap using the position of the first tile within the first tile's group and the position of the first tile's group within the bitmap;

calculating the position of the first pixel in the bitmap based on the position of the first pixel within the first tile and the position of the first tile within the bitmap;

calculating the position of the bitmap on the display screen based on the position of the first pixel in the bitmap; and calculating a performance metric used to quantify and improve user experience, including at least one of latency, smoothness, or evenness of a movement, the performance metric being calculated based at least in part on the position of the bitmap on the display screen.

9. The computer-readable storage medium of claim 8, further comprising:

if the color value of the first pixel matches the color value of the delimiter, performing one or more pixel movements across the bitmap by reading the color value of a pixel at a distance of a pre-determined number of pixels until a second pixel is located in a second tile of a different color value;

determining the color values of each of the other tiles within the second tile's group;

determining the position of the second pixel within the second tile;

identifying the position of the second tile's group within the bitmap based on the color values of the tiles within the second tile's group;

identifying the position of the second tile within the bitmap using the position of the second tile within the second tile's group and the position of the second tile's group within the bitmap;

calculating the position of the second pixel in the bitmap based on the position of the second pixel within the second tile and the position of the second tile within the bitmap; and calculating the position of the first pixel in the bitmap based on the position of the second pixel in the bitmap.

10. The computer-readable storage medium of claim 8, wherein determining the color values of each of the other tiles within the first tile's group comprises:

reading color values of pixels a predetermined number of pixels away from the first tile in one or more directions in the bitmap.

11. The computer-readable storage medium of claim 10, wherein determining the color values of each of the other tiles within the first tile's group further determines the position of the first tile within the first tile's group.

12. The computer-readable storage medium of claim 8, wherein the bitmap comprises three color values.

13. The computer-readable storage medium of claim 8, wherein the performance metric comprises the evenness of movement of the bitmap on the display screen.

14. The computer-readable storage medium of claim 8, wherein reading a color value of a first pixel in the bitmap comprises reading a color value at a predetermined observation point on the display screen.

15. A system, comprising:

a processor; and a memory, wherein the memory includes a program executable in the processor to perform operations for tracking a window on a display screen, the operations comprising:

displaying a bitmap on the display screen, wherein the bitmap comprises a plurality of unique groups of colored tiles, wherein each tile comprises one or more pixels and an associated color value, and wherein the unique groups are separated by a delimiter that also comprises an associated color value;

reading a color value of a first pixel in the bitmap;

if the color value of the first pixel matches a color value of a first tile within a group, determining the color values of each of the other tiles within the first tile's group;

determining the position of the first pixel within the first tile;

identifying the position of the first tile's group within the bitmap based on the color values of the tiles within the first tile's group;

identifying the position of the first tile within the bitmap using the position of the first tile within the first tile's group and the position of the first tile's group within the bitmap;

calculating the position of the first pixel in the bitmap based on the position of the first pixel within the first tile and the position of the first tile within the bitmap;

calculating the position of the bitmap on the display screen based on the position of the first pixel in the bitmap; and calculating a performance metric used to quantify and improve user experience, including at least one of latency, smoothness, or evenness of a movement, the performance metric being calculated based at least in part on the position of the bitmap on the display screen.

16. The system of claim 15, the operations further comprising:

if the color value of the first pixel matches the color value of the delimiter, performing one or more pixel movements across the bitmap by reading the color value of a pixel at a distance of a pre-determined number of pixels until a second pixel is located in a second tile of a different color value;

determining the color values of each of the other tiles within the second tile's group;

determining the position of the second pixel within the second tile;

identifying the position of the second tile's group within the bitmap based on the color value of the tiles within the second tile's group;

identifying the position of the second tile within the bitmap using the position of the second tile within the second tile's group and the position of the second tile's group within the bitmap;

calculating the position of the second pixel in the bitmap based on the position of the second pixel within the second tile and the position of the second tile within the bitmap; and calculating the position of the first pixel in the bitmap based on the position of the second pixel in the bitmap.

17. The system of claim 15, wherein determining the color values of each of the other tiles within the first tile's group comprises:

reading color values of pixels a predetermined number of pixels away from the first tile in one or more directions in the bitmap.

18. The system of claim 17, wherein determining the color values of each of the other tiles within the first tile's group further determines the position of the first tile within the first tile's group.

19. The system of claim 15, wherein the bitmap comprises three color values.

20. The system of claim 15, wherein the performance metric comprises the evenness of movement of the bitmap on the display screen.

* * * * *